(12) United States Patent
Chen et al.

(10) Patent No.: US 10,601,001 B2
(45) Date of Patent: Mar. 24, 2020

(54) SECONDARY BATTERY (71) Applicant: CONTEMPORARY AMPEREX TECHNOLOGY CO., LIMITED, Ningde (CN)

(72) Inventors: Baisong Chen, Ningde (CN); Zhiyu Wang, Ningde (CN); Peng Wang, Ningde (CN)

(73) Assignee: CONTEMPORARY AMPEREX TECHNOLOGY, CO., LIMITED, Ningde (CN)

( * ) Notice: Subject to any disclaimer, the term of this patent is extended or adjusted under 35 U.S.C. 154(b) by 274 days.

(21) Appl. No.: 15/686,075

(22) Filed: Aug. 24, 2017

(65) Prior Publication Data

US 2018/0166666 A1    Jun. 14, 2018

(30) Foreign Application Priority Data

Dec. 9, 2016    (CN) .......................... 2016 1 1130362

(51) Int. Cl.
*H01M 2/26*    (2006.01)
*H01M 2/04*    (2006.01)
(Continued)

(52) U.S. Cl.
CPC ....... *H01M 2/0469* (2013.01); *H01M 2/0212* (2013.01); *H01M 2/06* (2013.01);
(Continued)

(58) Field of Classification Search
CPC ............ H01M 2/04; H01M 2/02; H01M 2/26; H01M 2/30; H01M 2/0212; H01M 2/0469; H01M 2/06; H01M 2/345
See application file for complete search history.

(56) References Cited

U.S. PATENT DOCUMENTS

2013/0196185 A1    8/2013    Yokoyama et al.
2014/0141296 A1*   5/2014    Nakai ................. H01M 2/1229
                                                            429/61
(Continued)

FOREIGN PATENT DOCUMENTS

CN    205666265 U    10/2016
JP    201228008 A     2/2012
(Continued)

OTHER PUBLICATIONS

Basic Abstract of WO 2012/048652 (Year: 2012).*
(Continued)

*Primary Examiner* — Alexander Usyatinsky
(74) *Attorney, Agent, or Firm* — Tucker Ellis LLP (57) ABSTRACT

A secondary battery, including a first terminal assembly, a second terminal assembly, a top cover plate, an electrode assembly and a first sealing piece; at least one of the first and second terminal assemblies is electrically insulated from the top cover plate; the first terminal assembly includes a connecting plate and deformable plate, the connecting plate is located at a side of the top cover plate away from the electrode assembly, the deformable plate is attached to the connecting plate; the first sealing piece is connected between the connecting plate and the top cover plate; in normal state, the first electrode plate is electrically connected with the connecting plate via the deformable plate, the second plate is electrically connected with the second terminal assembly; when internal pressure of the secondary battery exceeds reference pressure, the deformable plate can deform to electrically disconnect from the first electrode plate.

11 Claims, 4 Drawing Sheets

(51) Int. Cl.
*H01M 2/06* (2006.01)
*H01M 2/34* (2006.01)
*H01M 2/02* (2006.01)
*H01M 2/30* (2006.01)

(52) U.S. Cl.
CPC ............... *H01M 2/26* (2013.01); *H01M 2/30* (2013.01); *H01M 2/345* (2013.01)

(56) References Cited

U.S. PATENT DOCUMENTS

| | | | |
|---|---|---|---|
| 2015/0243961 A1* | 8/2015 | Urano | H01M 2/06 429/61 |
| 2015/0303441 A1* | 10/2015 | Takagi | H01M 2/22 429/61 |
| 2017/0098815 A1* | 4/2017 | Kim | H01M 2/348 |

FOREIGN PATENT DOCUMENTS

| | | | |
|---|---|---|---|
| JP | 2016-46158 A | | 4/2016 |
| WO | WO 2012/048652 | * | 4/2012 |
| WO | 2013076831 A1 | | 5/2013 |
| WO | WO 2013076831 | * | 5/2013 |

OTHER PUBLICATIONS

JPO Decision to grant a Patent for Application No. 2017222653 (Year: 2019).*

Extended European Search Report from corresponding European Application No. 17188328.3 dated Dec. 20, 2017.

* cited by examiner

SECONDARY BATTERY

CROSS-REFERENCE TO RELATED APPLICATIONS

The present application claims the benefit of priority to Chinese Patent Application No. 201611130362.8, filed on Dec. 9, 2016, the content of which is incorporated herein by reference in its entirety.

TECHNICAL FIELD

The present application relates to the technical field of energy storage device production and, particularly, to a secondary battery.

BACKGROUND

For an EV shell battery, in order to solve overcharge problem, a solution generally adopted in the industry is to cut off a main circuit of the battery before cell failure, which prevents the battery from being continuously charged, so as to guarantee safety of the battery. A common structure is that: a current interrupt device is connected between a first terminal and an electrode assembly, and a second terminal is always electrically insulated from the current interrupt device. When the battery is overcharged, gas is generated from the interior, and when internal gas pressure increases to a certain value, the current interrupt device is activated to make the first terminal be electrically disconnected from the electrode assembly, thereby preventing the battery from being continuously charged. In such a structure, in order to prevent the current interrupt device from directly contacting and being electrically connected with a top cover plate, usually an insulating piece is arranged between the current interrupt device and the top cover plate. In order to guarantee good sealing effect of the battery, one sealing piece is arranged at a side of the insulating piece close to the interior of the battery, and another sealing piece is arranged between the insulating piece and the current interrupt device.

However, for the above-mentioned sealing piece, since the sealing piece is located in the interior of the battery and the battery is full of electrolyte, resulting in a large contacting area between the sealing piece and the electrolyte, during a long period of use, the sealing piece is easily decomposed, and when the battery is working, heat produced by the cell in the battery may easily soften the sealing piece, thereby reducing the sealing effect of the sealing piece, leading to leakage of the electrolyte in a serious case, which reduces reliability of the battery.

SUMMARY

The present application provides a secondary battery, which can solve the above problems.

The present application provides a secondary battery, including a first terminal assembly, a second terminal assembly, a top cover plate, an electrode assembly and a first sealing piece, the electrode assembly includes a first electrode plate, a second electrode plate and a separator between the first electrode plate and the second electrode plate;

at least one of the first terminal assembly and the second terminal assembly is electrically insulated from the top cover plate;

the first terminal assembly includes a connecting plate and a deformable plate, the connecting plate is located at a side of the top cover plate away from the electrode assembly, and the deformable plate is attached to the connecting plate;

the first sealing piece is connected between the connecting plate and the top cover plate;

in a normal state, the first electrode plate is electrically connected with the connecting plate via the deformable plate, and the second electrode plate is electrically connected with the second terminal assembly;

the deformable plate is configured to deform to electrically disconnect from the first electrode plate when an internal pressure of the secondary battery exceeds a reference pressure.

Preferably, the secondary battery further includes a fixing piece, the connecting plate is fixed to the top cover plate via the fixing piece.

Preferably, the fixing piece extends through the first sealing piece.

Preferably, the top cover plate is provided with a second through-hole, and the first sealing piece is provided with a second protrusion, the second protrusion extends into the second through-hole; the fixing piece extends through the second through-hole and the second protrusion.

Preferably, the secondary battery further includes a conductive plate, and the top cover plate is provided with a first through-hole, the deformable plate, the conductive plate and the first through-hole are correspondingly arranged; the first sealing piece is arranged along an outer periphery of the first through-hole;

in a normal state, the deformable plate is electrically connected with the first electrode plate via the conductive plate.

Preferably, the conductive plate extends through the first through-hole, the conductive plate includes a stepped surface facing toward the connecting plate, and the first sealing piece overlaps the stepped surface.

Preferably, the first sealing piece is provided with a first protrusion protruding in a direction toward the first electrode plate, the first protrusion extends into the first through-hole, and the conductive plate extends through the first protrusion.

Preferably, the secondary battery further includes a first member, the conductive plate is connected with the first member, and the first member is fixed to the top cover plate via the fixing piece.

Preferably, along a deforming direction of the deformable plate, the first protrusion is closely contacted with the first member.

Preferably, the secondary battery further includes a resistance element, the second terminal assembly is electrically insulated from the top cover plate;

the first terminal assembly is electrically connected with the top cover plate via the resistance element.

Technical solutions provided by the present application can achieve the following beneficial effects:

For the secondary battery provided by the present application, since the first sealing piece is arranged between the connecting plate and the top cover plate, the first sealing piece will not be in direct contact with the electrolyte, which prevents decomposition of the first sealing piece by the electrolyte. Moreover, the first sealing piece is located outside the secondary battery, which can also reduce risks of being softened of the first sealing piece by heat produced by the cell in operation, so that service life of the first sealing piece can be extended, which guarantees reliability of sealing of the secondary battery.

It should be understood that, both the above general description and the following detailed description are only exemplary and cannot limit the scope of the present application.

REFERENCE SIGNS

10—top cover plate;
   101—first through-hole;
   102—second through-hole;
20—connecting plate;
   201—exhaust hole;
   202—recess portion;
21—first sealing piece;
   211—first protrusion;
   212—second protrusion;
   213—third protrusion;
22—second member;
30—second terminal assembly;
31—conductive block;
32—second insulating piece;
33—second sealing piece;
34—first insulating piece;
40—deformable plate;
50—conductive plate;
60—first member;
   601—fourth protrusion;
70—fixing piece;
80—resistance element;
90—third sealing piece.

The drawings herein are incorporated into and constitute a part of the present specification, which show exemplary embodiments in accordance with the present application and explain principles of the present application together with the present description.

DESCRIPTION OF EMBODIMENTS

The present application will be further illustrated with reference to the accompanying drawings and embodiments.

As shown in FIGS. 1-7, the present application provides a secondary battery, including a first terminal assembly, a second terminal assembly 30, a top cover plate 10, an electrode assembly (not shown in figures), a deformable plate 40 and a first sealing piece 21. The secondary battery further includes a case (not shown in figures). The electrode assembly includes a first electrode plate, a second electrode plate and a separator between the first electrode plate and the second electrode plate.

The top cover plate 10 seals the case and forms accommodating space together with the case. The electrode assembly is arranged in the accommodating space. At least one of the first terminal assembly and the second terminal assembly 30 is electrically insulated from the top cover plate 10.

The first terminal assembly includes a connecting plate 20 and the deformable plate 40, and the deformable plate 40 is attached to the connecting plate 20. The connecting plate 20 is located at a side of the top cover plate 10 away from the electrode assembly, that is, the connecting plate 20 is outside the accommodating space. The first sealing piece 21 is connected between the connecting plate 20 and the top cover plate 10.

In a normal state, the first electrode plate is electrically connected with the connecting plate 20 via the deformable plate 40, and the second electrode plate is electrically connected with the second terminal assembly 30. When an internal pressure of the secondary battery exceeds a reference pressure, the deformable plate 40 can deform to electrically disconnect from the first electrode plate, and thus to electrically disconnect the connecting plate 20 from the first electrode plate.

For the secondary battery in the above exemplary embodiment, by providing the first sealing piece 21 between the connecting plate 20 and the top cover plate 10, the first sealing piece 21 will not be in direct contact with electrolyte in the accommodating space, which prevents decomposition of the first sealing piece by the electrolyte. Moreover, the first sealing piece 21 is outside the secondary battery, which can also reduce risks of the first sealing piece 21 being softened by heat produced by a cell during operation, so that service life of the first sealing piece 21 can be extended, which guarantees reliability of sealing of the secondary battery.

In order to allow the deformable plate 40 to be conveniently connected with the first electrode plate, the secondary battery further includes a conductive plate 50, and the top cover plate 10 is provided with a first through-hole 101. The deformable plate 40, the conductive plate 50 and the first through-hole 101 are correspondingly arranged. In a normal state, the deformable plate 40 is electrically connected with the first electrode plate via the conductive plate 50.

Optionally, the conductive plate 50 extends through the first through-hole 101, which can reduce the overall height of the first terminal assembly, the second terminal assembly 30 and the top cover plate 10, so that the accommodating space which accommodates the electrode assembly can make larger, thereby increasing energy density of the secondary battery. The conductive plate 50 is insulated from the first through-hole 101, the conductive plate 50 can be directly or indirectly electrically connected with the first through-hole 101.

Generally, the secondary battery further includes a first member 60, the conductive plate 50 is fixed to the top cover plate 10 via the first member 60, and the first member 60 is a conductive piece or an insulating piece.

Generally, the secondary battery further includes a fixing piece 70, the connecting plate 20 is fixed to the top cover plate 10 via the fixing piece 70, and the fixing piece 70 is not in direct contact with the connecting plate 20 and/or the top cover plate 10 (for example, an insulating sleeve or an insulating layer is provided at a cooperating position between the fixing piece 70 and the connecting plate 20 and/or the top cover plate 10), especially when the connecting plate 20 is not in direct contact with the top cover plate 10, reliability of a connection between the connecting plate 20 and the top cover plate 10 can be improved. When the first member 60 is provided, the first member 60 is connected with the top cover plate 10 via the fixing piece 70, and the conductive plate 50 is connected with the first member 60. Specifically, connection manners between the fixing piece 70 and the top cover plate 10 and between the fixing piece 70 and the connecting plate 20 can be implemented as follows:

In a first manner, the fixing piece 70 and the top cover plate 10 are formed as an integrated structure, the connecting plate 20 is provided with a third through-hole, the fixing piece 70 is inserted into the third through-hole and is fixedly riveted to the connecting plate 20, and the fixing piece 70 is not in direct contact with the connecting plate 20 (for example, an insulating sleeve or an insulating layer is provided at a cooperating position between the fixing piece 70 and the connecting plate 20), so as to prevent the connecting plate 20 from being electrically conducted with the top cover plate 10 via the fixing piece 70.

In a second manner, the top cover plate 10 is provided with a second through-hole 102, the fixing piece 70 and the connecting plate 20 are formed as an integrated structure, the fixing piece 70 is inserted into the second through-hole 102 and is fixedly riveted to the top cover plate 10, and the fixing piece 70 is not in direct contact with the top cover plate 10 (for example, an insulating sleeve or an insulating layer is provided at a cooperating position between the fixing piece 70 and the top cover plate 10), so as to prevent the connecting plate 20 from being electrically conducted with the top cover plate 10 via the fixing piece 70.

Figure 3:
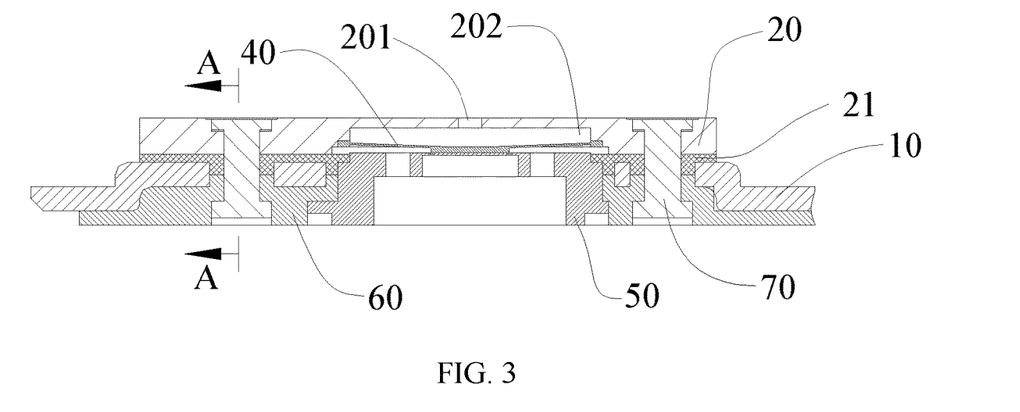
FIG. 3 is a partial schematic view of a secondary battery in accordance with an exemplary embodiment of the present application.
Figure 3A:
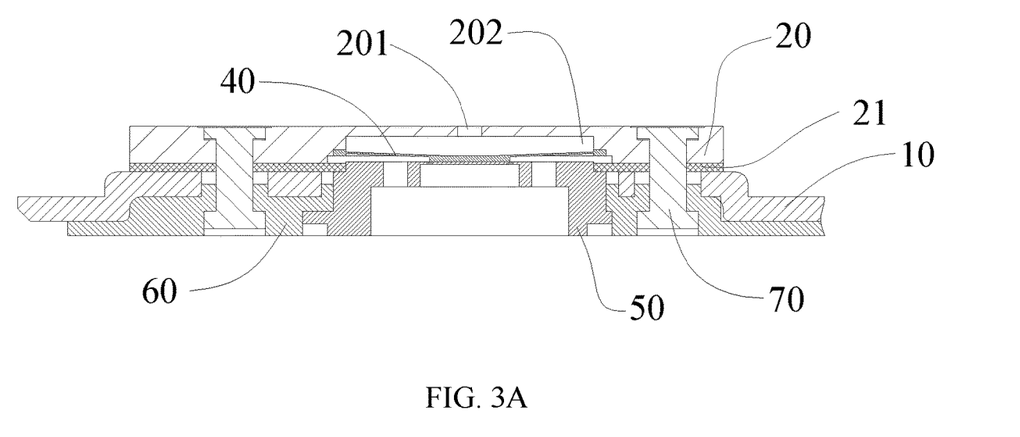
FIG. 3A is a structural schematic view of a secondary battery in accordance with another exemplary embodiment of the present application.
Figure 3B:
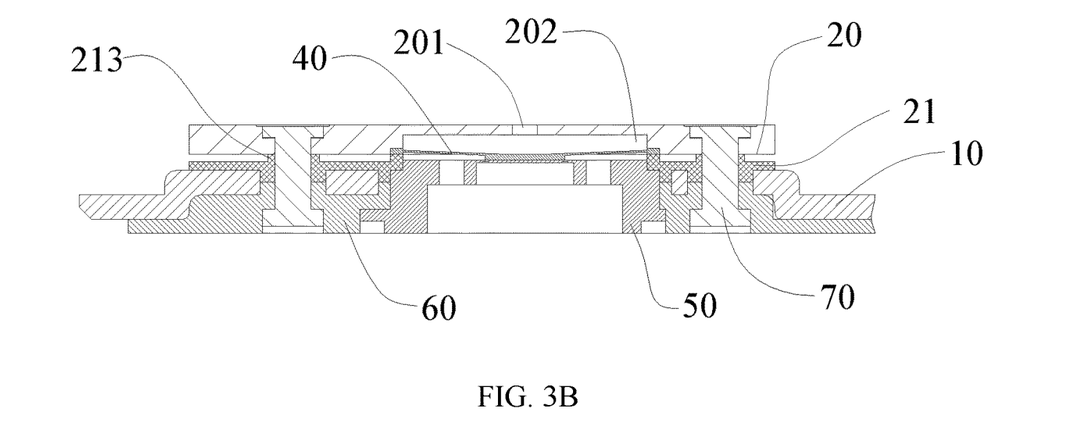
FIG. 3B is a structural schematic view of a secondary battery in accordance with still another exemplary embodiment of the present application.
Figure 3C:
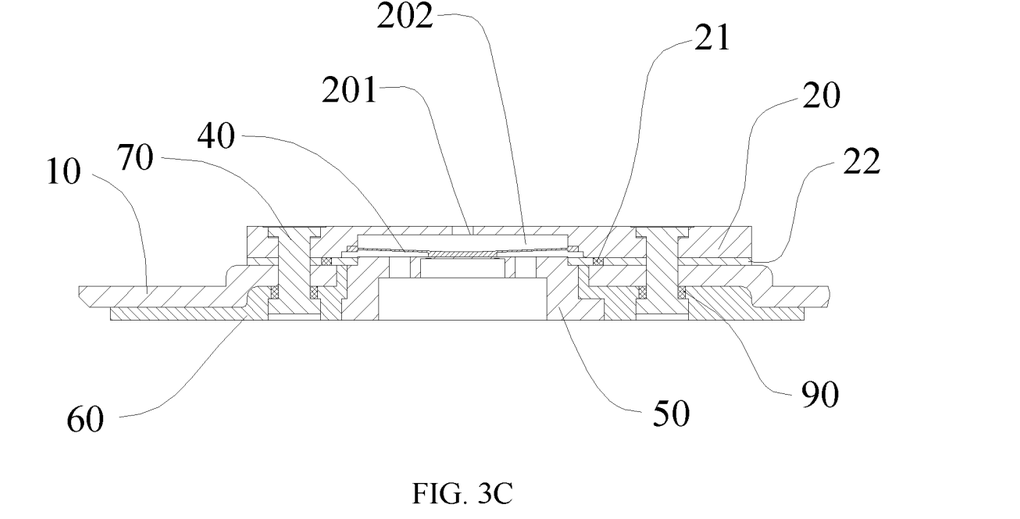
FIG. 3C is a structural schematic view of a secondary battery in accordance with still another exemplary embodiment of the present application.

In a third manner, as shown in FIGS. 3-3C, the connecting plate 20 is provided with a third through-hole, the top cover plate 10 is provided with a second through-hole 102, the connecting plate 20 is fixed to the top cover plate 10 through the fixing piece 70 extending through the third through-hole and the second through-hole 102. Generally, two ends of the fixing piece 70 are respectively riveted to the connecting plate 20 and the top cover plate 10, moreover, the fixing piece 70 is not in direct contact with the connecting plate 20 (for example, an insulating sleeve or an insulating layer is provided at a cooperating position between the fixing piece 70 and the connecting plate 20) or the fixing piece 70 is not in direct contact with the top cover plate 10 (for example, an insulating sleeve or an insulating layer is provided at a cooperating position between the fixing piece 70 and the top cover plate 10), so as to prevent the connecting plate 20 from being electrically conducted with the top cover plate 10 via the fixing piece 70.

The first sealing piece 21 is formed as a ring-shaped structure, as shown in FIG. 3C, the first sealing piece 21 is provided at an outer periphery of the first through-hole 101, when the fixing piece 70 adopts the second manner or the third manner, the secondary battery further includes a third sealing piece 90, the third sealing piece 90 is arranged between the fixing piece 70 and the top cover plate 10, so as to achieve sealing between the fixing piece 70 and the top cover plate 10.

The first sealing piece 21 can also be formed as a sheet-shaped structure, as shown in FIGS. 3-3B, the connecting plate 20, the first sealing piece 21 and the top cover plate 10 are arranged by stacking. Specifically, the first sealing piece 21 is provided with a fourth through-hole, when the conductive plate 50 is provided, the conductive plate 50 extends through the fourth through-hole and is electrically connected with the deformable plate 40. When the fixing piece 70 is provided, the fixing piece 70 is provided at an outer periphery of the first sealing piece 21 or provided inside the first sealing piece 21. Alternatively, when the fixing piece 70 is provided, the fixing piece 70 extends through the first sealing piece 21, that is, the first sealing piece 21 is provided with a fifth through-hole so that the fixing piece 70 can extend through, the sheet-shaped first sealing piece 21 can be implemented by the following manners:

In a first manner, as shown in FIG. 3A, the first sealing piece 21 includes two opposite surfaces, that is, a first surface and a second surface. Both the first surface and the second surface are formed as a planar structure, the first surface is closely contacted with the connecting plate 20, and the second surface is closely contacted with the top cover plate 10.

Figure 4:
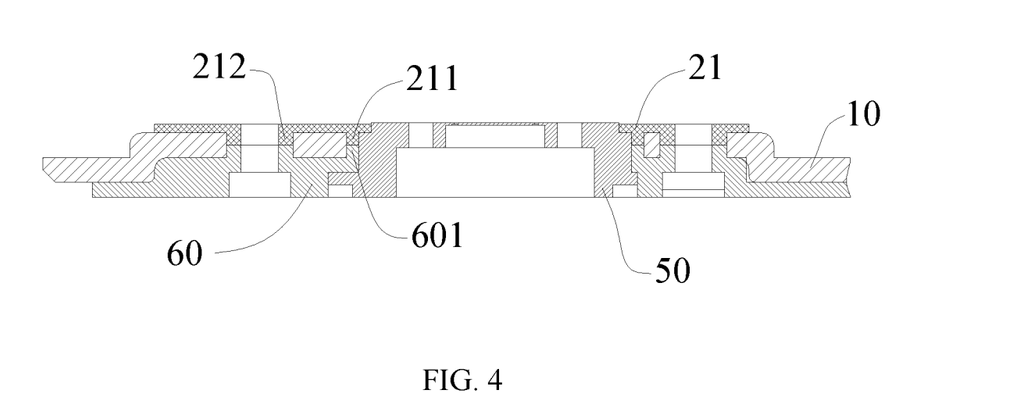
FIG. 4 a partial schematic view of a first sealing piece, a first member, a conductive plate and a top cover plate of a secondary battery in accordance with an exemplary embodiment of the present application.

In a second manner, as shown in FIGS. 3 and 4, based on the first manner, a first protrusion 211 is further provided, and the first protrusion 211 protrudes in a direction toward the first electrode plate, that is, the second surface is provided with the first protrusion 211, the first protrusion 211 extends into the first through-hole 101, and the conductive plate 50 extends through the first protrusion 211, so as to improve sealing effect between the top cover plate 10 and the connecting plate 20, and to prevent poor sealing between the first sealing piece 21 and the top cover plate 10 and between the first sealing piece 21 and the connecting plate 20 due to relative sliding.

Since sealing of the first sealing piece 21 is generally implemented by extrusion, in an extending direction of the top cover plate 10, a gap is provided between the first protrusion 211 and an inner wall of the first through-hole 101, or between the first protrusion 211 and the conductive plate 50, so that deforming space is provided for extruding the first sealing piece 21 so as to achieve sealing.

In a third manner, as shown in FIGS. 3 and 4, based on the first manner, a second protrusion 212 is further provided, and the second protrusion 212 protrudes in a direction toward the first electrode plate, that is, the second surface is provided with the second protrusion 212, the second protrusion 212 extends into the second through-hole 102. The fixing piece 70 extends through the second through-hole 102 and the second protrusion 212, so as to improve sealing effect between the top cover plate 10 and the fixing piece 70, moreover, the first sealing piece 21 is limited via the protruding structure, thereby preventing poor sealing due to sliding.

In an extending direction of the top cover plate 10, a gap is provided between the second protrusion 212 and an inner wall of the second through-hole 102, or between the second protrusion 212 and the fixing piece 70, so that deforming space is provided for extruding the first sealing piece 21 so as to achieve sealing.

In a fourth manner, as shown in FIG. 3B, based on the first manner, a third protrusion 213 is further provided, and the third protrusion 213 protrudes in a direction toward the connecting plate 20, the third protrusion 213 is closely contacted with the connecting plate 20, that is, the first surface is provided with the third protrusion 213. In this case, the first surface is closely contacted with the connecting plate 20 via the third protrusion 213, since an area of the first surface is relatively large, and the processing accuracy is not so desirable, it is difficult to achieve total fitting for a large surface area, resulting in poor sealing between the connecting plate 20 and the first surface. By providing the third protrusion 213, a contact area between the connecting plate 20 and the first sealing piece 21 is reduced, thereby improving sealing effect therebetween. One or more third protrusions 213 is provided, and the third protrusion 213 is formed as a strip-shaped structure, preferably a closed ring-shaped structure, so as to further improve sealing effect.

Figure 5:
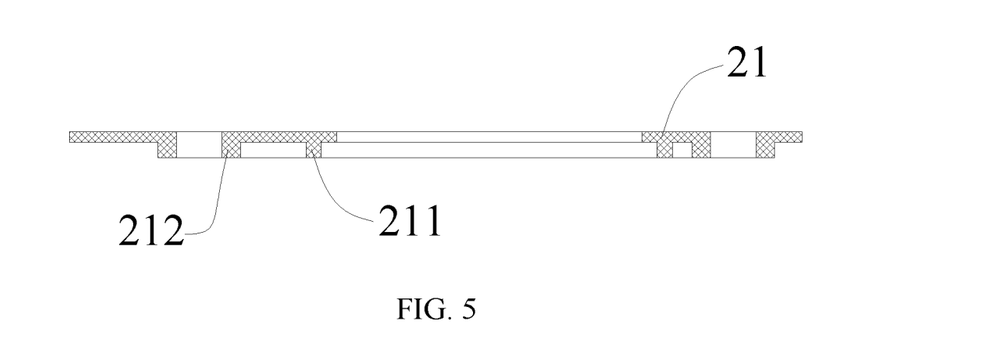
FIG. 5 is a structural schematic view of a first sealing piece of a secondary battery in accordance with an exemplary embodiment of the present application.
Figure 6:
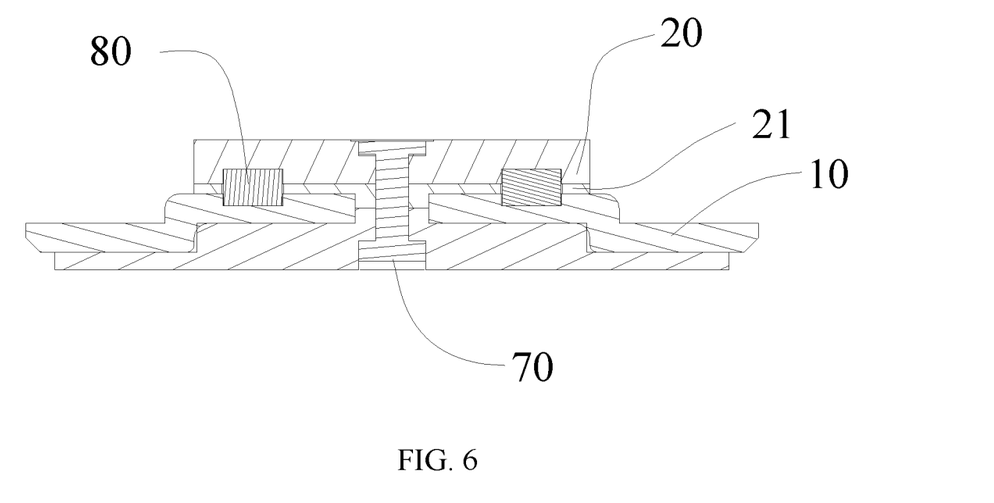
FIG. 6 is a sectional view along line A-A in FIG. 3.

Structures of the first sealing piece 21 shown in the second, third and fourth manners are provided separately, or any two thereof are provided at the same time, as shown in FIGS. 3 and 5, the first protrusion 211 and the second protrusion 212 are provided at the same time. Or the three structures are provided at the same time, as shown in FIG. 3B, the first protrusion 211, the second protrusion 212 and the third protrusion 213 are provided at the same time.

The first protrusion 211 and the second protrusion 212 are provided, along a deforming direction of the deformable plate 40, the first protrusion 211 and the second protrusion 212 are closely contacted with the first member 60, as shown in FIG. 4. If the first protrusion 211 and the second protrusion 212 are not provided, it is possible that metal shaving will remain in a gap defined between the first sealing piece 21, the top cover plate 10, the first member 60 and the fixing piece 70, or remain in a gap defined between the first sealing piece 21, the top cover plate 10, the first member 60 and the conductive plate 50, which may result in the fixing piece 70 or the conductive plate 50 being electrically connected with the top cover plate 10. Of course, it is also possible that only one of the first protrusion 211 and the second protrusion 212 is closely contacted with the first member 60.

Figure 1:
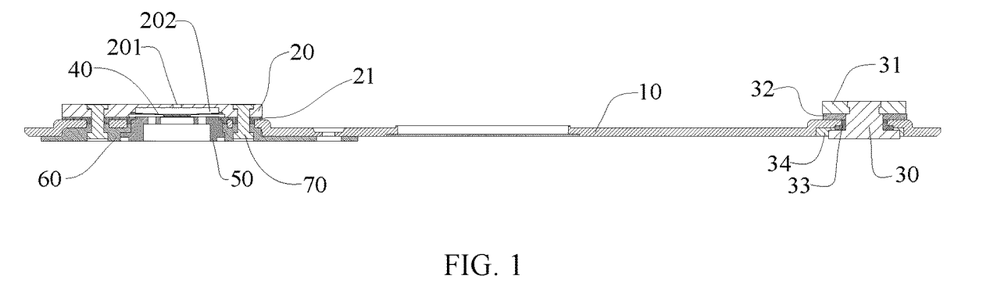
FIG. 1 is a structural schematic view of a secondary battery in accordance with an exemplary embodiment of the present application.
Figure 2:
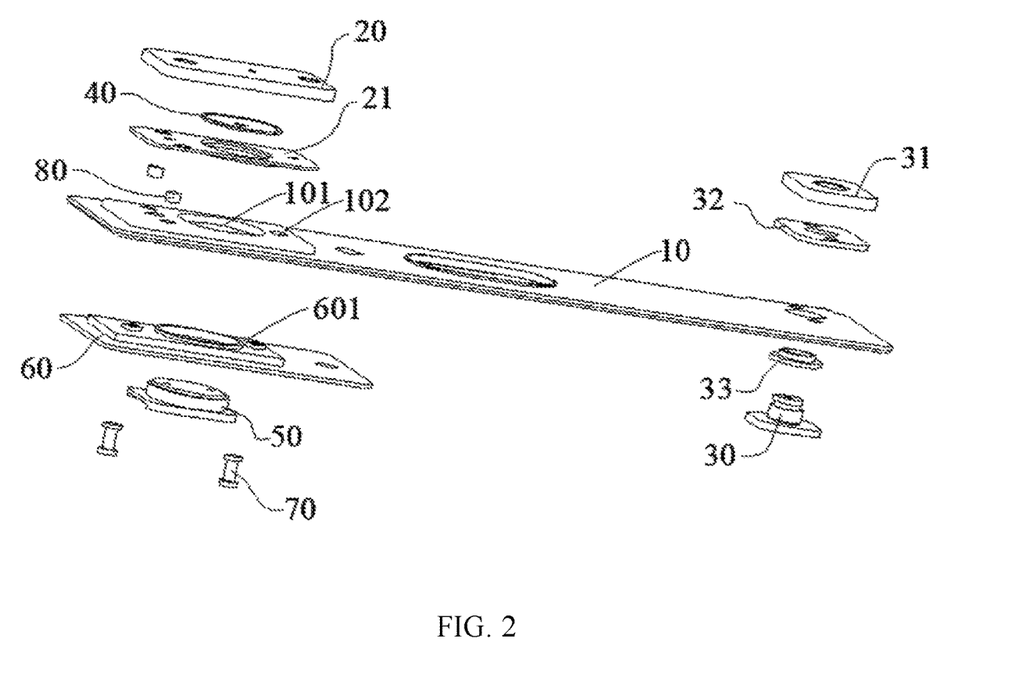
FIG. 2 is an exploded view of a secondary battery in accordance with an exemplary embodiment of the present application.

Further, the first member 60 is provided with a fourth protrusion 601 protruding in a direction toward the connecting plate 20, as shown in FIG. 2, a plurality of fourth protrusions 601 is provided, respectively extending into the first through-hole 101 or the second through-hole 102. In order that the conductive plate 50 and the fixing piece 70 can be better insulated from the top cover plate 10, the first member 60 is made of an insulating material. Moreover, the first member 60 is closely contacted with the first sealing piece 21, such a structure can better guarantee fitting therebetween, and can also guarantee installation accuracy of the first member 60 and the conductive plate 50.

Figure 7:
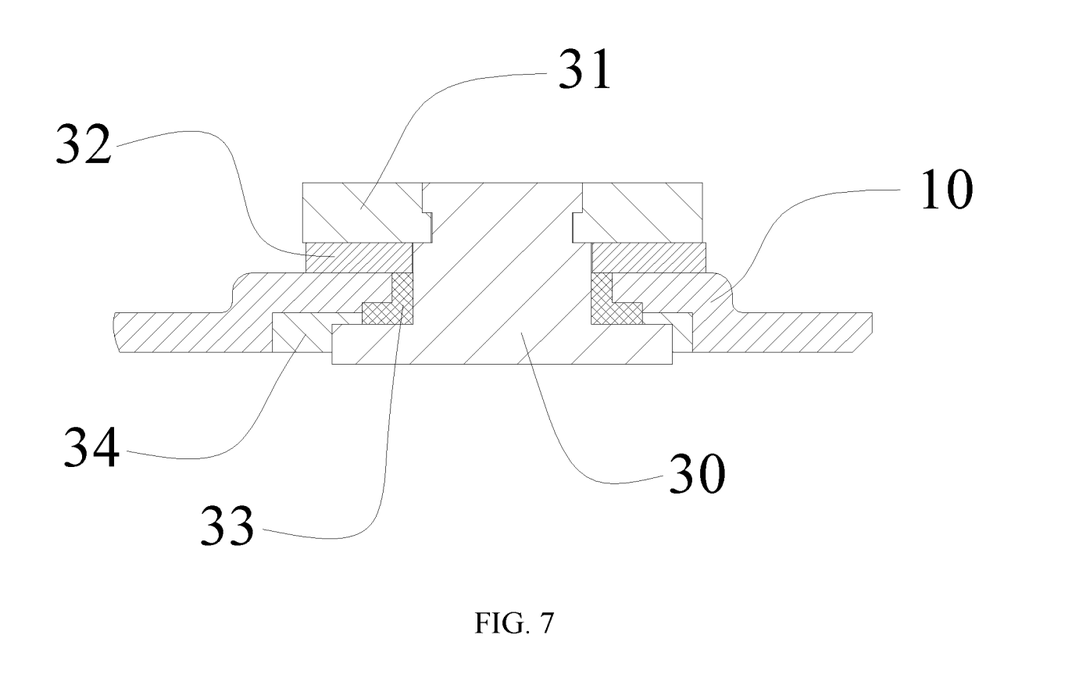
FIG. 7 is another partial schematic view of a secondary battery in accordance with an exemplary embodiment of the present application.

Generally, the connecting plate 20 and the second terminal assembly 30 are respectively installed to the top cover plate 10. In order to facilitate the secondary battery to be electrically connected with an external device, both the connecting plate 20 and the second terminal assembly 30 extend out of the top cover plate 10. Further, the secondary battery further includes a conductive block 31, as shown in FIG. 7, the conductive block 31 is in contact and electrically connected with the second terminal assembly 30, and the second terminal assembly 30 is electrically connected with an external device via the conductive block 31, which allows the second terminal assembly 30 to be conveniently connected with the external device. The first electrode plate is a positive electrode plate (the first terminal assembly is a positive terminal), accordingly, the second electrode plate is a negative electrode plate (the second terminal assembly is a negative terminal). Alternatively, the first electrode plate can also be a negative electrode plate (the first terminal assembly is a negative terminal), and the second electrode plate is a positive electrode (the second terminal assembly is a positive terminal).

In the above exemplary embodiments, both the first terminal assembly and the second terminal assembly 30 are electrically insulated from the top cover plate 10; or only one of the first terminal assembly and the second terminal assembly 30 is electrically insulated from the top cover plate 10 while the other one thereof is electrically connected with the top cover plate 10. The electrically connected one is in direct contact and electrically connected with the top cover plate 10, or indirectly electrically connected with the top cover plate 10. When the electrically connected one is electrically connected with the top cover plate 10, usually a resistance element 80 is provided for indirect connection. In order to better reduce loop current when nailing, a resistance value of the resistance element 80 is generally selected to be 1~100000Ω, such as 1Ω, 50Ω, 100Ω, 5000Ω, 10000Ω, 80000Ω, 100000Ω, etc. Of course, the resistance value of the resistance element 80 can also be selected to be 0.9Ω, 110000Ω, etc., the specific selection depends on required resistance value at each position of the loop. The resistance element 80 can be implemented as follows:

In a first exemplary embodiment, both the deformable plate 40 and the resistance element 80 are arranged at a same terminal, that is, the first terminal assembly is electrically connected with the top cover plate 10 via the resistance element 80, and the second terminal assembly 30 is electrically insulated from the top cover plate 10, as shown in FIG. 3.

Specifically, the conductive block 31 is electrically insulated from the top cover plate 10 via a second insulating piece 32. In order to guarantee sealing between the second terminal assembly 30 and the top cover plate 10, usually a second sealing piece 33 or sealant is adopted for sealing. Insulation between the second terminal assembly 30 and the top cover plate 10 is achieved via a first insulating piece 34, a sealant or an insulating paint. The second sealing piece 33 and the second insulating piece 32 are formed as an integrated structure, that is, the second sealing piece 33 is an insulation sealing piece, which can adopt the same structure of the first sealing piece 21.

Usually, the connecting plate 20 is not in direct contact with the top cover plate 10, and a second member 22 is provided between the connecting plate 20 and the top cover plate 10, the second member 22 is an insulating piece or a conductive piece. Optionally, the first sealing piece 21 and the second member 22 are formed as an integrated structure, as shown in FIG. 3, or, the first sealing piece 21 is arranged inside the second member 22, as shown in FIG. 3C. Since resistance value of metals is too small, when the second member 22 is a conductive piece, material of the second member 22 is generally non-metallic material, such as conductive plastic. A recess portion 202 is provided at a side of the connecting plate 20 close to the top cover plate 10, so as to provide space for deforming of the deformable plate 40, as shown in FIGS. 3-3C, the recess portion 202, the deformable plate 40 and the first through-hole 101 correspond to each other in sequence. The deformable plate 40 is provided with deforming space by additionally providing the recess portion 202, which prevents the connecting plate 20 from affecting deforming of the deformable plate 40, thereby guaranteeing reliability of deforming of the deformable plate 40, and when an internal pressure of the secondary battery exceeds a reference pressure, an electrical connection between the deformable plate 40 and the first electrode plate can be timely interrupted. Generally, in the deforming direction of the deformable plate 40, projection of the deformable plate 40 is in projection of the recess portion 202.

The recess portion 202 is formed by recessing from a side of the connecting plate 20 close to the top cover plate 10 in a direction away from the top cover plate 10. Along the deforming direction of the deformable plate 40, the recess portion 202 can penetrate through the connecting plate 20 or can be sealed at a bottom thereof away from the top cover plate 10. When the recess portion 202 is sealed at the bottom, since when the internal pressure of the secondary battery exceeds the reference pressure and pushes the deformable plate 40 to deform, as the deformable plate 40 deforming, gas in the recess portion 202 is extruded and the pressure increases, which prevents the deformable plate 40 from deforming, or even leads to that the deformable plate 40 cannot be deformed completely, and thus the deformable plate 40 may not be disconnected from the first electrode plate. In order to solve this problem, the connecting plate 20 is provided with an exhaust hole 201, the exhaust hole 201 penetrates through the connecting plate 20 along the deforming direction of the deformable plate 40, and the exhaust hole 201 is opposite to the deformable plate 40.

The resistance element 80 is formed as a columnar structure or a sheet-shaped structure. Specifically, the resistance element 80 can be provided in the following manners:

In a first manner, the resistance element 80 is provided between the top cover plate 10 and the connecting plate 20, in this case, the connecting plate 20 is not in direct contact with the top cover plate 10, and the connecting plate 20 is electrically connected with the top cover plate 10 via the resistance element 80. When the second member 22 is provided, the resistance element 80 and the second member 22 are formed as an integrated structure, that is, the resistance element 80 and the second member 22 are integrated as a whole structure. When the second member 22 is an insulating piece, the resistance element 80 extends through the second member 22, and two ends of the resistance element 80 are respectively connected with the top cover plate 10 and the connecting plate 20, generally, the resistance element 80 herein is formed as a columnar structure. Optionally, when the second member 22 is a conductive piece, the second member 22 and the resistance element 80 adopt the same material, in this case, the second member 22 is the resistance element 80, the integrated structure is preferably a sheet-shaped structure, the material can be conductive plastic, that is, the resistance element 80 is formed as a sheet-shaped structure, and the connecting plate 20, the resistance element 80 and the top cover plate 10 are arranged by stacking, so as to increase reliability of the connection.

When the conductive plate 50 is provided, the conductive plate 50 is not in contact with the top cover plate 10, or that the conductive plate 50 is insulated from the top cover plate 10, as shown in FIG. 4, by providing the first member 60, in this case, the first member 60 is an insulating piece.

In a second manner, when the conductive plate 50 is provided, the resistance element 80 is provided between the conductive plate 50 and the top cover plate 10, that is, the conductive plate 50 is electrically connected with the top cover plate 10 via the resistance element 80, which makes the connecting plate 20 be electrically connected with the top cover plate 10 successively through the deformable plate 40, the conductive plate 50 and the resistance element 80. In this manner, the connecting plate 20 is not directly electrically conducted with the top cover plate 10. As a result, the connecting plate 20 needs to be insulated from the top cover plate 10. In order to ensure the connecting plate 20 is insulated from the top cover plate 10, the second member 22 or the first sealing piece 21 is an insulating piece, or, an insulating glue or an insulating paint is arranged between the connecting plate 20 and the top cover plate 10.

Optionally, the resistance element 80 is formed as a columnar structure, when the conductive plate 50 is inserted into the first through-hole 101, the resistance element 80 is arranged between the inner wall of the first through-hole and the conductive plate 50. Optionally, the resistance element 80 can also be arranged at a side of the top cover plate 10 close to the electrode assembly. The first member 60 and the resistance element 80 are formed as an integrated structure, that is, the first member 60 and the resistance element 80 are integrated as a whole structure. When the first member 60 is an insulating piece, the resistance element 80 extends through the first member 60, and two ends of the resistance element 80 are respectively connected with the conductive plate 50 and the top cover plate 10; when the first member 60 is a conductive plate, the first member 60 and the resistance element 80 are formed by adopting the same material (such as conductive plastic), in this case, the first member 60 is the resistance element 80.

In a second exemplary embodiment, the deformable plate 40 and the resistance element 80 are arranged at different terminals, that is, the second terminal assembly 30 is electrically connected with the top cover plate 10 via the resistance element 80; and the first terminal assembly is electrically insulated from the top cover plate 10. The connecting plate 20 is electrically insulated from the top cover plate 10 via a second member 22, the conductive plate 50 is electrically insulated from the top cover plate 10 via the first member 60, in this case, the second member 22 and the first member 60 are both insulating pieces.

The above description only illustrates the preferred embodiments of the present application and is not intended to limit the present application, and various modifications and variations may be made by those skilled in the art. However, any modifications, equivalent substitutions, improvements and the like within the spirit and principles of the present application shall be included in the protection scope of the present application.

What is claimed is:
1. A secondary battery, comprising a first terminal assembly, a second terminal assembly, a top cover plate, an electrode assembly, a first sealing piece, a fixing piece and a conductive plate, wherein
   the electrode assembly comprises a first electrode plate, a second electrode plate and a separator between the first electrode plate and the second electrode plate;
   at least one of the first terminal assembly and the second terminal assembly is electrically insulated from the top cover plate;
   the first terminal assembly comprises a connecting plate and a deformable plate, the connecting plate is located at a side of the top cover plate away from the electrode assembly, and the deformable plate is attached to the connecting plate;
   the first sealing piece is connected between the connecting plate and the top cover plate;
   in a normal state, the first electrode plate is electrically connected with the connecting plate via the deformable plate, and the second electrode plate is electrically connected with the second terminal assembly;

the deformable plate is configured to deform to electrically disconnect from the first electrode plate when an internal pressure of the secondary battery exceeds a reference pressure;

wherein the connecting plate is fixed to the top cover plate via the fixing piece, and the fixing piece extends through the first sealing piece;

wherein the top cover plate is provided with a first through-hole; the deformable plate, the conductive plate and the first through-hole are correspondingly arranged; the first sealing piece is arranged along an outer periphery of the first through-hole; and in a normal state, the deformable plate is electrically connected with the first electrode plate via the conductive plate; and wherein the conductive plate extends through the first through-hole, the conductive plate comprises a stepped surface facing toward the connecting plate, and the first sealing piece overlaps the stepped surface.

2. The secondary battery according to claim 1, wherein the top cover plate is provided with a second through-hole, and the first sealing piece is provided with a second protrusion, the second protrusion extends into the second through-hole; and the fixing piece extends through the second through-hole and the second protrusion.

3. The secondary battery according to claim 1, wherein the first sealing piece is provided with a first protrusion protruding in a direction toward the first electrode plate, the first protrusion extends into the first through-hole, and the conductive plate extends through the first protrusion.

4. The secondary battery according to claim 3, further comprising a first member, wherein the conductive plate is connected with the first member, and the first member is fixed to the top cover plate via the fixing piece.

5. The secondary battery according to claim 4, wherein along a deforming direction of the deformable plate, the first protrusion is closely contacted with the first member.

6. The secondary battery according to claim 1, further comprising a resistance element;
the second terminal assembly is electrically insulated from the top cover plate; and
the first terminal assembly is electrically connected with the top cover plate via the resistance element.

7. A secondary battery, comprising a first terminal assembly, a second terminal assembly, a top cover plate, an electrode assembly, a first sealing piece, a fixing piece and a conductive plate, wherein
the electrode assembly comprises a first electrode plate, a second electrode plate and a separator between the first electrode plate and the second electrode plate;
at least one of the first terminal assembly and the second terminal assembly is electrically insulated from the top cover plate;
the first terminal assembly comprises a connecting plate and a deformable plate, the connecting plate is located at a side of the top cover plate away from the electrode assembly, and the deformable plate is attached to the connecting plate;
the first sealing piece is connected between the connecting plate and the top cover plate;
in a normal state, the first electrode plate is electrically connected with the connecting plate via the deformable plate, and the second electrode plate is electrically connected with the second terminal assembly;
the deformable plate is configured to deform to electrically disconnect from the first electrode plate when an internal pressure of the secondary battery exceeds a reference pressure;
wherein the connecting plate is fixed to the top cover plate via the fixing piece, and the fixing piece extends through the first sealing piece;
wherein the top cover plate is provided with a first through-hole; the deformable plate, the conductive plate and the first through-hole are correspondingly arranged; the first sealing piece is arranged along an outer periphery of the first through-hole; and
in a normal state, the deformable plate is electrically connected with the first electrode plate via the conductive plate; and
wherein the first sealing piece is provided with a first protrusion protruding in a direction toward the first electrode plate, the first protrusion extends into the first through-hole, and the conductive plate extends through the first protrusion.

8. The secondary battery according to claim 7, wherein the top cover plate is provided with a second through-hole, and the first sealing piece is provided with a second protrusion, the second protrusion extends into the second through-hole; and the fixing piece extends through the second through-hole and the second protrusion.

9. The secondary battery according to claim 7, further comprising a first member, wherein the conductive plate is connected with the first member, and the first member is fixed to the top cover plate via the fixing piece.

10. The secondary battery according to claim 9, wherein along a deforming direction of the deformable plate, the first protrusion is closely contacted with the first member.

11. The secondary battery according to claim 7, further comprising a resistance element;
the second terminal assembly is electrically insulated from the top cover plate; and
the first terminal assembly is electrically connected with the top cover plate via the resistance element.

* * * * *